(12) United States Patent
Teng

(10) Patent No.: US 8,701,550 B2
(45) Date of Patent: Apr. 22, 2014

(54) VERSATILE TEA INFUSER

(76) Inventor: Eric Y. Teng, Gold River, CA (US)

( * ) Notice: Subject to any disclaimer, the term of this patent is extended or adjusted under 35 U.S.C. 154(b) by 355 days.

(21) Appl. No.: 12/930,993

(22) Filed: Jan. 20, 2011

(65) Prior Publication Data

US 2011/0183042 A1 Jul. 28, 2011

Related U.S. Application Data

(60) Provisional application No. 61/336,519, filed on Jan. 22, 2010.

(51) Int. Cl.
*A47J 31/00* (2006.01)

(52) U.S. Cl.
USPC .......................................................... 99/323

(58) Field of Classification Search
USPC ........... 99/275, 279, 280, 281, 282, 283, 284, 99/287, 288, 289 D, 289 R, 290, 295, 297, 99/299, 300, 302 R, 304, 306, 307, 316, 99/317, 322, 323, 323.3, 318, 321; 426/77, 82, 425, 431, 432, 433, 435, 426/531, 590, 594, 597, 665

See application file for complete search history.

(56) References Cited

U.S. PATENT DOCUMENTS

| 3,354,812 | A | | 11/1967 | Gorton, Jr. | |
| 5,623,865 | A | * | 4/1997 | Sidiropoulos | 99/323 |
| 2007/0169634 | A1 | * | 7/2007 | Khalifa | 99/279 |

* cited by examiner

*Primary Examiner* — Dana Ross
*Assistant Examiner* — Joseph Iskra
(74) *Attorney, Agent, or Firm* — Law Offices of David M. Lang; David M. Lang

(57) ABSTRACT

An integral tea infuser apparatus is provided to compress brewed tea leaves. In accordance with one embodiment: a tea infuser apparatus comprises a top member and a bottom member set to slidably mate with each other forming open, closed and compressed positions. The top member has a top tea retainer cover and a top compressor side having a top push-pull handle, and the bottom member has a bottom tea retainer and a bottom compressor side having a bottom push-pull handle.

1 Claim, 2 Drawing Sheets

VERSATILE TEA INFUSER

CROSS-REFERENCE TO RELATED APPLICATIONS

This application claims the benefit of provisional patent application Ser. No. 61/336,519 filed Jan. 22, 2010 by the present inventor.

FIELD OF THE INVENTION

This present invention relates to apparatus for tea preparation or brewing.

REFERENCES

U.S. Pat. No. 739,470 Frederick Wegner
U.S. Pat. No. 2,678,000 Scheidt et al.
U.S. Pat. No. 3,342,518 Gorton et al.
U.S. Pat. No. 5,806,409 Barrie Lee Johnson et al.
U.S. Pat. No. 5,967,019 Johnson et al.
U.S. Pat. No. 7,077,054 B1 Hurlock
Pat. Appl. Pub. 2003/0226 Jessica Cohen
Pat. Appl. Pub. 2008/0028945A1 Martin J Almond

BACKGROUND

Tea drinkers often use tea infusers or commonly known as tea balls for tea brewing. A tea infuser has a retainer which can be of various forms and shapes such as that of a ball, a tube, or in some fancy shapes such as a heart or a tea pot. The surface of the retainer usually has a number of fine holes arranged in some kind of pattern. The retainer can be filled with loose tea leaves or a teabag, and then be submerged under hot water so as to brew the tea within the retainer. A tea infuser often has an elongated handle, or otherwise has a connecting chain with a hook at one end that will be kept above the water level to allow easy retrieval of the unit after tea brewing.

Most tea infusers require a user to hand-stuff in an amount of tea leaves inside the retainer before it is immersed into a cup of very hot water for tea brewing. After sufficient time of brewing, the concentrated brew will seep out from the retainer through the fine holes into the hot water turning it into hot tea. To speed up the process and to reduce waste, the user often will have to repeatedly dunk the tea infuser into the hot water, or otherwise swirl the tea infuser around the hot water to allow more of the concentrated brew to come out of the retainer quickly.

It can be seen from the above description that tea brewing can require a fair amount of time and effort with the result that there is always a considerable amount of concentrated brew remaining inside the retainer that will be wasted as the brewed tea leaves are dumped. Additionally, the tea infuser still having a considerable amount of concentrated brew would tend to drip as the tea infuser is removed thus creating a mess.

For better convenience, drinkers often use teabags that can be dunked directly into a cup containing hot water for tea brewing. However, when this is done, the teabag would quickly rise to the surface as the air inside of it expands with the heat making tea brewing unduly long. Only after sufficient brewing time, then the tea bag will finally submerge. To counter this effect, a user often finds it necessary to have to use a spoon to force the teabag to remain submerged under the hot water. After the tea bag is sufficiently brewed, the user would then often have to repeatedly dunk the tea bag into the hot water so as to force more of the concentrated brew out.

In this case again, there is still a considerable amount of concentrated brew that remains within the tea bag. In order to be able to squeeze out this out, some users use what is called a tea press or tea squeeze in the shape of a pair of small flat spoons connected by a biased-open U-bend spring handle to squeeze out more of the concentrated brew. So now an additional separate implement is required in order to accomplish this.

Thus, there is a need for a tea infuser that will help speed up tea brewing, reduces waste, simplifies the process, and prevent dripping as presented herein.

OBJECTS AND ADVANTAGES

The objects and advantages of the present invention are:
To provide a new type of tea infuser that:
a) can be used as a tea spoon to scoop out loose tea leaves from a tea container;
b) can also be used to accommodate teabags and hold it submerged under hot water for fast brewing;
c) provides an integral means to squeeze brewed tea so as to speed up the brewing process without need for repeated dunking or stirring of the prior art tea infusers;
d) provides an integral means to squeeze out the last drop of concentrated tea to reduce waste;
e) provides an integral means to squeeze out the last drop of concentrated brew to prevent dripping.

Still further objects and advantages will become apparent from a consideration of the ensuing descriptions and drawings.

SUMMARY

A new type of tea infuser has integral means to squeeze the brewed tea. By virtue of its design, this invention can be used to scoop out loose tea leaves from a container, or be used to accommodate a tea bag allowing this invention to be used to brew both loose tea leaves and tea bags. In accordance with one embodiment: a tea implement comprises a top retainer cover-compressor having a top push-pull handle, and a bottom retainer base-compressor having a bottom push-pull handle; with both parts slidably attached to each other forming a complete unit.

DRAWINGS—FIGURES

REFERENCE NUMERALS

Figure 1:
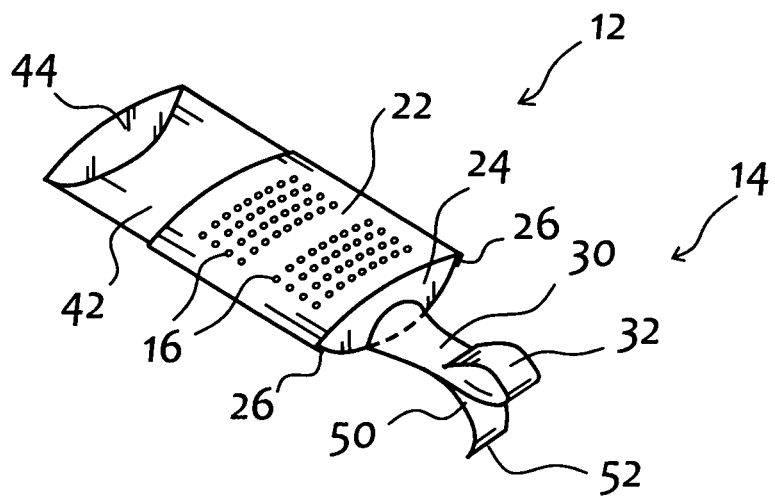
FIG. 1 is a perspective side view of the tea infuser showing it in a half-open position.

Reference Numerals 12 retainer
14 handle
16 fine holes
22 top cover
24 top compressor side
26 parallel sliding railings
30 top push-pull handle
32 thumb-rest end
42 bottom retainer base 44 bottom compressor side
50 bottom push-pull handle
52 hook end

DETAILED DESCRIPTION OF THE INVENTION

This section provides a description of the preferred embodiment:

FIG. 1 shows a perspective side-view of the tea infuser in a half open position with its tea retainer 12 and its pair of handles 14. There are a number of fine holes 16 forming a pattern on the surface of the tea retainer 12. The fine holes can be located on the top and/or the bottom of the tea retainer and/or its sides. The purpose of the fine holes is for allowing brewed tea concentrate to seep out from the tea retainer 12 into the hot water. So the size of the holes will determined the size of loose tea leaves that it can retain within the tea retainer for brewing.

Figure 2A:
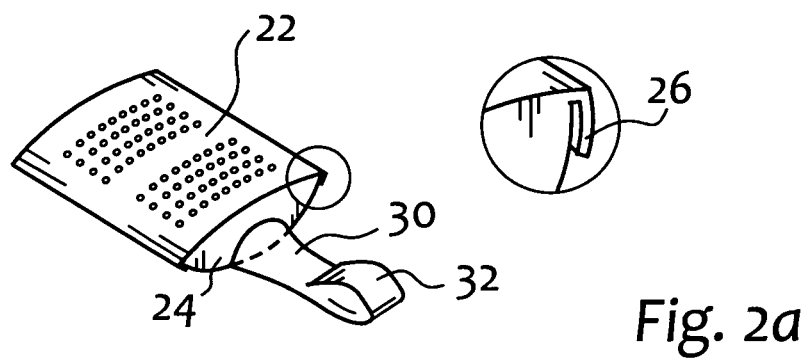
FIGS. 2a and 2b show the respective top and bottom members of the tea infuser with detail of sliding sides on top member shown in enlarged detail.

In FIG. 2a, the top member has a cover 22 and a top compressor side 24 which together forms the top retainer portion of the tea infuser and functions as its cover-compressor. The two sides of the cover 22 have corresponding inward-bending parallel sliding railings 26. The top retainer portion connects to a top push-pull handle 30 with a thumb-rest end 32. The top handle 30 is shown to be a separate piece welded onto the top compressor side 24 via a half circular base that has a perpendicular bend. The handle 30 can also be an extended part of the top compressor side in a one-piece construction without welding.

Figure 2B:
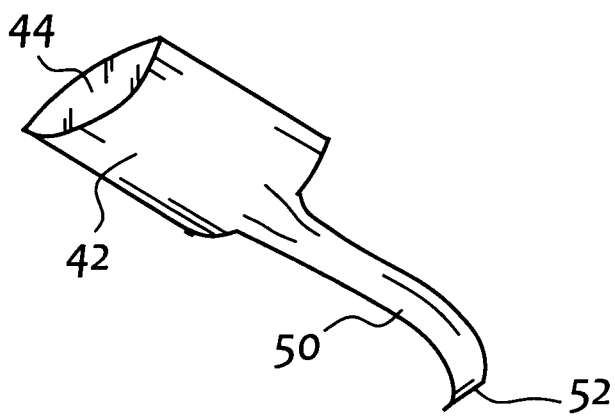

FIG. 2b shows the bottom member having a bottom retainer base 42 and a bottom compressor side 44 which together forms the bottom retainer-compressor portion of the tea retainer. The two sides of the bottom retainer base 42 are shown to curve upwards with their edges fitting into the inward bending parallel sliding railings 26 on the top cover-compressor. The bottom retainer-compressor adjoins a bottom push-pull handle 50 with a hook end 52. The bottom handle 50 is shown to be integral with the bottom retainer 42.

Figure 3A:
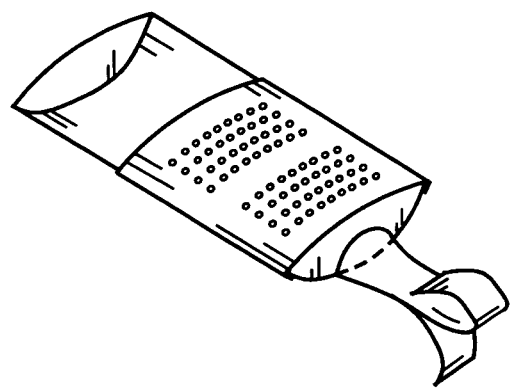
FIGS. 3a, 3b and 3c show the tea infuser in its respective open, closed and compressed positions.
Figure 3B:
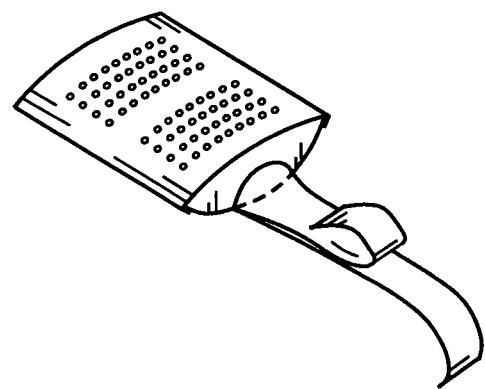

During use, a user holds the unit in his/her hand with the thumb resting on the thumb-rest end 32 with the hook end 52 of the unit resting on the index finger. The top unit is then pulled upward relative to the bottom unit thus opening the device as shown in FIG. 3a. It can be seen that the tea infuser can now be used as a tea scoop to scoop out a quantity of loose tea leaves from a tea container. Alternatively, the user can elect to put a tea bag inside the tea retainer. After the tea retainer is filled, the top unit is then pushed downwards enclosing the tea leaves or the tea bag within forming its closed position as shown in FIG. 3b.

With the device in its closed position, the user submerges the retainer portion of the device under near-boiling hot water inside a cup. The hook end 52 of the device allows it to be hooked onto and be attached to the sidewall of the cup keeping the handle above the water for easy retrieval regardless of how deep the hot water is.

Figure 3C:
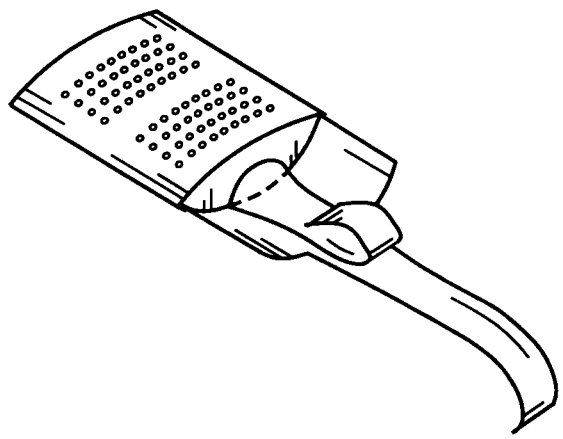

As the tea inside the tea retainer is brewed by the hot water, concentrated brew starts to seep out through the fine holes 16 thus infusing it into the hot water gradually turning it into hot tea. To speed up this process, a user can elect to alternatively push and release the top half of the device to compress the tea leaves within the retainer portion so as to force more concentrated brew to seep out of the retainer quickly. When tea brewing is done, the user lifts the device out of the hot water and push-slide the top half of the device further downwards as shown in FIG. 3c to again squeeze the tea leaves. This will again force out more of the concentrated tea to increase the flavor and will dry the tea infuser preventing it from dripping. The cup of hot tea is then ready to be enjoyed.

When compared to the common tea infuser without means for compressing tea, it can be seen that this invention can make tea brewing faster and reduce the waste of tea. By virtue of its design, this device can also be used as a tea scoop for tea leaves, or as a tea stirrer, and can also be used to accommodate a tea bag making it the most versatile tea infuser there is.

Although the discussion so far has been about this device being used for tea brewing, but obviously it can also be used to brew other kind of substances for the purpose of infusing them into a liquid, e.g. for coffee brewing, or herbal medicine brewing, or for infusing dried herbs and spices for cooking etc.

While the preferred embodiment of the present invention has been described in the specifications and drawings, it should be apparent that other modifications and adaptations can be achieved by those skilled in the art. Therefore the scope of this invention is hereby set forth and defined by the following Claims.

The invention claimed is:

1. An implement for the brewing of beverage component to infuse it into a liquid comprising a top member and a bottom member; said top member comprising a curved top retainer portion adjoining a top push-pull handle means, the push-pull handle having a thumb-rest end; said top retainer portion comprising a retainer cover, having a plurality of holes and two sides with inwardly bending parallel sliding railings, abutting a top compressor side; said bottom member comprising a bottom retainer portion adjoining a bottom push-pull handle means; said bottom retainer portion comprising a curved retainer base having sides abutting a bottom compressor side; wherein the sides of said bottom retainer base fit into the inwardly-bending parallel sliding railings of said retainer cover, wherein said top member and bottom member mate and are slidingly engaged, wherein said top and bottom retainer portions form a retainer means and cooperate to slide against each other forming respective open, closed and compressed positions; whereby brewed beverage component can be compressed in between said top and bottom compressor sides.

* * * * *